US010338619B2

(12) United States Patent
Goyal et al.

(10) Patent No.: US 10,338,619 B2
(45) Date of Patent: Jul. 2, 2019

(54) VOLTAGE REGULATOR WITH PERFORMANCE COMPENSATION

(71) Applicant: NXP B.V., Eindhoven (NL)

(72) Inventors: Shishir Goyal, Bangalore (IN); Arvind Sherigar, Bangalore (IN)

(73) Assignee: NXP B.V., San Jose, CA (US)

( * ) Notice: Subject to any disclaimer, the term of this patent is extended or adjusted under 35 U.S.C. 154(b) by 25 days.

(21) Appl. No.: 15/805,145

(22) Filed: Nov. 7, 2017

(65) Prior Publication Data

US 2019/0138041 A1 May 9, 2019

(51) Int. Cl.
*H02M 3/157* (2006.01)
*G05F 1/575* (2006.01)

(52) U.S. Cl.
CPC .................................... *G05F 1/575* (2013.01)

(58) Field of Classification Search
CPC . G05F 1/46; G05F 1/462; G05F 1/463; G05F 1/465; G05F 1/467; G05F 1/56; G05F 1/565; G05F 1/567; G05F 1/569; G05F 1/575; H02M 3/00; H02M 3/02; H02M 3/04; H02M 3/10; H02M 3/145; H02M 3/155; H02M 3/1552; H02M 3/156; H02M 3/1563; H02M 3/157; H02M 3/158; H02M 3/1588; H02M 1/08; H02M 1/088; H02M 1/096; H02M 2001/0009; H02M 2001/0012; H02M 2001/0016; H02M 2001/0025; H02M 2001/0029; H02M 2001/0041
USPC ................ 323/222–226, 241, 266, 269–277, 323/281–286, 289, 299–303, 304, 323/311–317, 322, 351, 907; 713/300–340; 327/108, 109, 261, 262; 326/82–92
See application file for complete search history.

(56) References Cited

U.S. PATENT DOCUMENTS

| | | | | |
|---|---|---|---|---|
| 6,222,354 | B1 | 4/2001 | Song | |
| 6,268,716 | B1 | 7/2001 | Burstein | |
| 6,288,563 | B1 * | 9/2001 | Muljono | H03K 19/0005 326/27 |
| 6,437,622 | B1 | 8/2002 | Tinsley et al. | |

(Continued)

OTHER PUBLICATIONS

Yongfu Li et al., "A 0.45-to-1.2-V Fully Digital Low-Dropout Voltage Regulator with Fast-Transient Controller for Near/Subthreshold Circuits," IEEE Transactions on Power Electronics, vol. 31, No. 9, Sep. 2016.

*Primary Examiner* — Gary L Laxton
*Assistant Examiner* — Carlos O Rivera-Perez
(74) *Attorney, Agent, or Firm* — Charles E. Bergere

(57) ABSTRACT

A digitally-assisted voltage regulator includes a gate driver circuit and a compensation circuit. The voltage regulator digitizes the load profile, and uses the digital information to compensate for process and temperature variations. The voltage regulator outputs a regulated voltage signal and one or more control signals based on a supply voltage and a reference voltage. The gate driver circuit receives the regulated voltage signal and generates a gate driver signal. The compensation circuit receives the control signal and generates first and second compensation signals. The voltage regulator regulates a voltage level of the regulated voltage signal using the regulator compensation signal, and controls a ramp-rate of the gate driver signal using the second compensation signal.

22 Claims, 3 Drawing Sheets

(56) References Cited

U.S. PATENT DOCUMENTS

| | | | | |
|---|---|---|---|---|
| 7,508,246 | B2 | 3/2009 | Kase et al. | |
| 7,602,166 | B1 | 10/2009 | Kang | |
| 8,901,904 | B2 | 12/2014 | Caldwell | |
| 9,170,592 | B2 | 10/2015 | Seymour et al. | |
| 2007/0285031 | A1* | 12/2007 | Shteynberg ........... | H02M 3/157<br>315/294 |
| 2011/0291637 | A1* | 12/2011 | Vijayaraghavan .... | H02M 3/155<br>323/311 |
| 2014/0266103 | A1 | 9/2014 | Wang | |
| 2016/0124448 | A1 | 5/2016 | Murukumpet | |
| 2017/0075402 | A1 | 3/2017 | Pant et al. | |

* cited by examiner

-PRIOR ART-

VOLTAGE REGULATOR WITH PERFORMANCE COMPENSATION

BACKGROUND

The present invention relates generally to voltage regulators, and, more particularly, to a digitally-assisted voltage regulator with performance compensation.

Integrated circuits such as system-on-chips (SoCs) and application specific integrated circuits (ASICs) often are designed as mixed signal circuits, which integrate various components such as amplifiers, analog-to-digital converters, digital-to-analog converters, step-up converters, and boost converters (hereinafter "electronic components") on a single chip. A boost converter steps-up a supply voltage and provides the stepped-up voltage to other electronic components. Boost converters are susceptible to variations in physical operating conditions such as process, voltage, and temperature (PVT). For example, process spread during manufacturing may affect operational parameters such as bandwidth, slew rate, and leakage current of the electronic components. An unstable supply voltage and heating of the boost converter may result in voltage and temperature variations. Thus, PVT variations may degrade the performance of the boost converter, which in turn affects the performance of other mixed signal circuits driven by the boost converter.

A boost converter includes an on-chip voltage regulator to compensate for voltage variations. The voltage regulator rejects noise injected into the supply voltage from a voltage source to provide a stable supply voltage. However, the process and temperature variations can still effect the regulated supply voltage. One solution to overcome this problem is to connect on-chip process and temperature sensors to the voltage regulator to compensate for PVT variations.

FIG. 1 is a schematic block diagram of a conventional boost converter 100. The boost converter 100 includes process and temperature sensors 102 and 104 connected to a voltage regulator 106. The boost converter 100 further includes a gate driver 108, a transistor 110, an inductor 112, a diode 114, a load capacitor 116, a load 118, and a voltage supply 120. The process and temperature sensors 102 and 104, the voltage regulator 106, the gate driver 108, and the transistor 110 typically are integrated on an integrated circuit (IC) 122, while the inductor 112, diode 114, load capacitor 116, load 118, and voltage supply 120 typically are off-chip.

The voltage supply 120 provides a supply voltage VSUPPLY. The process sensor 102 is connected between the voltage supply 120 and ground, and generates a process compensation signal PCS. The temperature sensor 104 also is connected between the voltage supply 120 and ground, and generates a temperature compensation signal TCS. The voltage regulator 106, which also is connected between the voltage supply 120 and ground, receives the process and temperature compensation signals PCS and TCS, and generates an output voltage VOUT. The gate driver 108 is connected between the voltage regulator 106 and ground, and receives the output voltage VOUT from the voltage regulator 106, a control signal ENABLE from an external control circuit (not shown), and generates a gate driver signal GDS.

The transistor 110 has a gate connected to the gate driver 108 for receiving the gate driver signal GDS, a source connected to ground, and a drain connected to a node between the inductor 112 and the diode 114. When the gate driver signal GDS is active, it switches ON the transistor 110. The diode 114, which is connected between the inductor

112 and the load capacitor 116, prevents the load capacitor 116 from discharging back to the transistor 110. The load capacitor 116, which is connected between the diode 114 and ground, supplies a load current to the load 118 when the transistor 110 is ON.

When the transistor 110 is switched ON, the diode 114 is reverse biased, and the inductor 112 is connected to the voltage supply 120 by way of the transistor 110. As the supply voltage VSUPPLY has a constant voltage level, the inductor 112 is charged by a linearly increasing current of the supply voltage VSUPPLY. The load 118 discharges the load capacitor 116. Conversely, when the transistor 110 is switched OFF, the diode 114 is forward biased, and the inductor 112 is connected to the load capacitor 116 by way of the diode 114. The inductor 112 then charges the load capacitor 116.

Process and temperature variations affect the operational parameters of the gate driver 108, which in turn causes the ramp-rate of the gate driver signal GDS to deviate from a desired ramp-rate. The ramp-rate represents the rate of increase of current in the gate driver signal GDS. The deviation of the GDS ramp-rate results in erroneous switching of the transistor 110. The process and temperature sensors 102 and 104 measure process and temperature variations, and generate the process and temperature compensation signals PCS and TCS, respectively, which the voltage regulator 106 uses to generate the output voltage VOUT.

Although the process and temperature sensors 102 and 104 compensate for process and temperature variations, they increase die area, making the boost converter 100 bulky and complex, and increasing the cost of the IC 122. Therefore, it would be advantageous to have a boost converter that compensates for PVT variations but does not require process and temperature sensors.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
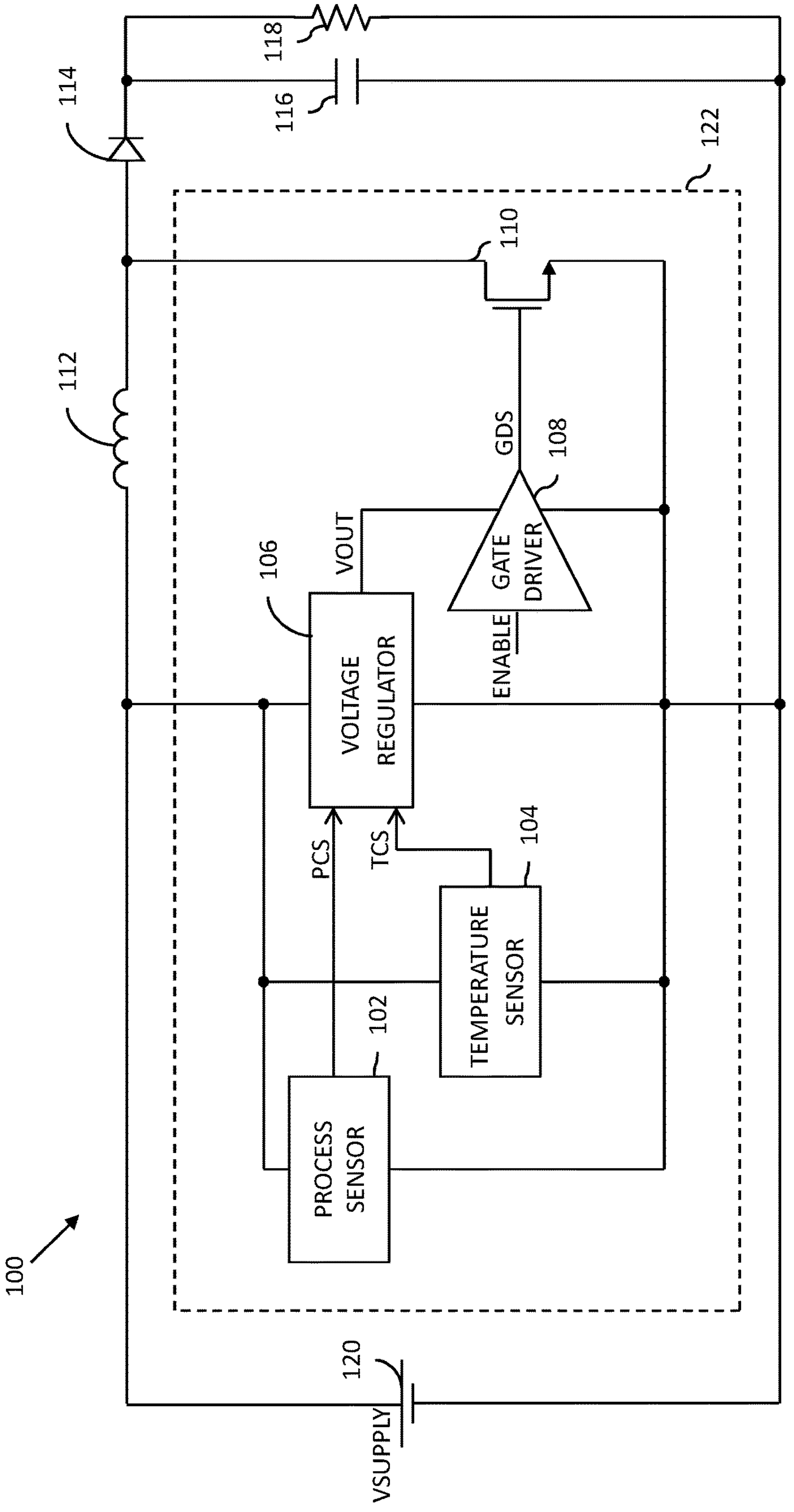
FIG. 1 is a schematic block diagram of a conventional boost converter.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention comprises a digitally-assisted voltage regulator with a compensation circuit, and a variable strength gate driver circuit. The voltage regulator receives a supply voltage VSUPPLY and a reference voltage VREF, and generates an output voltage VOUT and at least one control signal. The gate driver circuit is connected to the voltage regulator and receives the output voltage VOUT. The gate driver circuit outputs a gate driver signal. The compensation circuit is connected to the voltage regulator and receives the at least one control signal. The compensation circuit is generates a regulator compensation signal and a load compensation signal. The voltage regulator receives the regulator compensation signal RCS and regulates a voltage level of the output voltage VOUT therewith. The gate driver circuit receives the load compensation signal LCS and controls a ramp-rate of the gate driver signal.

Various embodiments of the present invention provide a digitally-assisted voltage regulator with a performance compensation circuit, and a gate driver. The voltage regulator digitizes the load profile, and uses the digitized load profile to compensate for process and temperature variations. The voltage regulator receives a supply voltage VSUPPLY and a reference voltage signal VREF, and outputs an output voltage VOUT and at least one control signal. The gate driver is connected to the voltage regulator and receives the output voltage VOUT, and generates a gate driver signal. The gate driver drains current from the voltage regulator based on the regulated voltage signal. A rate at which the gate driver circuit drains the current corresponds to a load profile of the gate driver. The control signal corresponds to a digital code that represents the load profile of the gate driver. PVT variations in the gate driver change the load profile of the gate driver, which in turn causes the ramp-rate of the gate driver signal to deviate from a desired ramp-rate. The voltage regulator outputs different digital codes that represent different load profiles of the gate driver, under different PVT conditions. The compensation circuit receives the digital codes, and refers to a digital reference code that stores information related to a plurality of reference digital load profiles of the gate driver, a desired voltage level of the regulated voltage signal for each reference digital load profile, and a desired strength of the gate driver circuit for each reference digital load profile. The compensation circuit selects a first reference digital load profile from the plurality of reference digital load profiles that matches a digital code represented by the control signal. The compensation circuit identifies a first desired voltage level of the regulated voltage signal and a first desired gate strength of the gate driver circuit corresponding to the first reference digital load profile from the digital reference code and generates a regulator compensation signal and a load compensation signal.

The voltage regulator receives the regulator compensation signal RCS and generates the regulated voltage signal at the first desired voltage level. The gate driver circuit receives the load compensation signal LCS and the regulated voltage signal at the first desired voltage level, and controls the ramp-rate of the gate driver signal based on the first desired gate strength. Hence, the deviation in the ramp-rate of the gate driver signal is corrected, thereby compensating the gate driver signal for PVT variations. The voltage regulator does not require conventional process and temperature sensors, so the die area and the circuit cost are lower than those of a conventional system.

Figure 2:
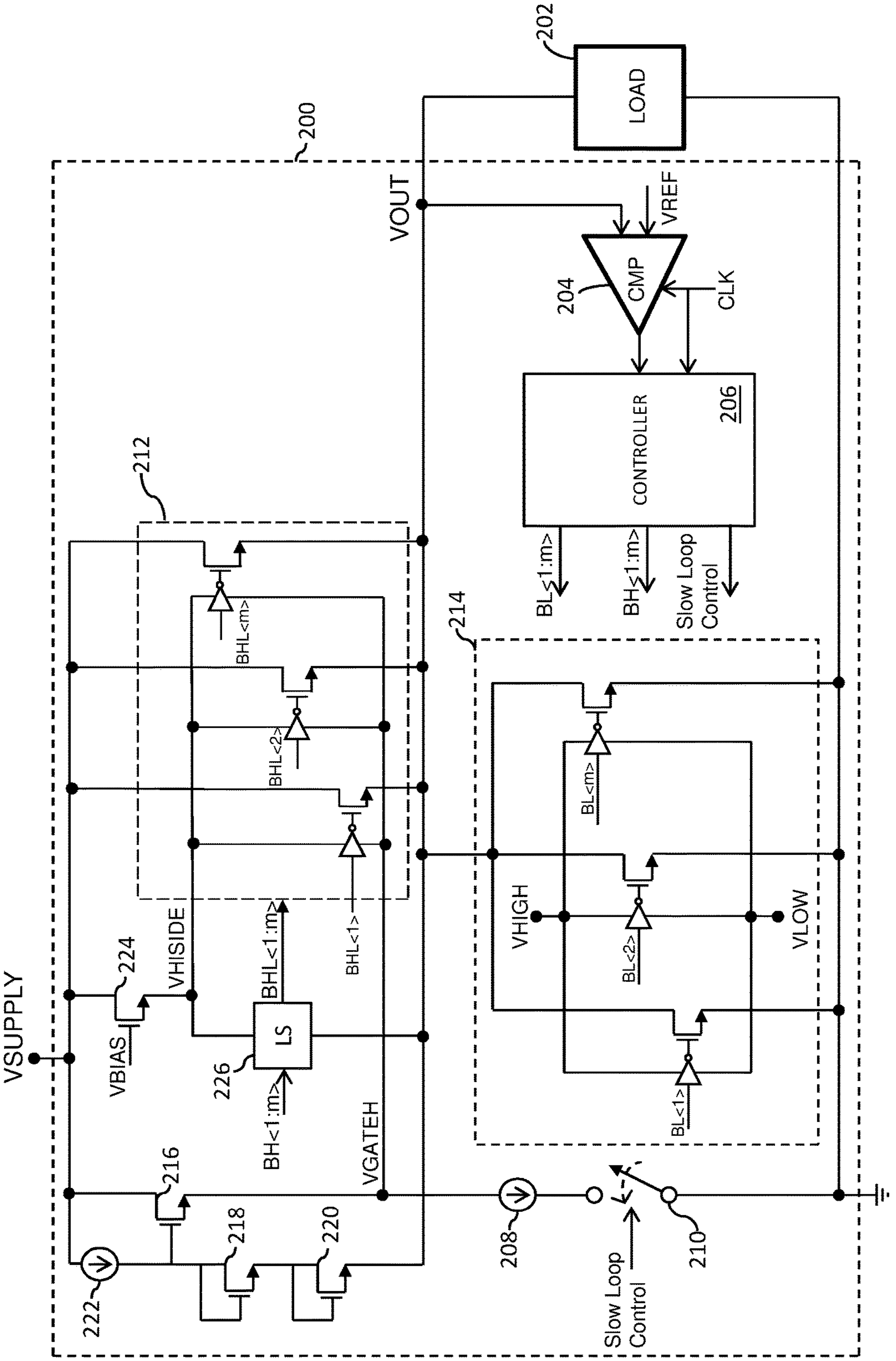
FIG. 2 is a schematic block diagram of an exemplary digitally-assisted voltage regulator of the present invention.

Referring now to FIG. 2, a schematic diagram of a digitally-assisted voltage regulator 200 in accordance with one embodiment of the present invention is shown. The voltage regulator 200 regulates a supply voltage VSUPPLY and supplies an output voltage VOUT to a load 202. The output voltage VOUT is a regulated voltage signal. The output voltage VOUT is compared to a reference voltage VREF with a clocked comparator 204, and the output of the comparator 204 is provided to a digital controller 206. The digital controller 206 generates a plurality of control signals based on the comparison result, including a slow loop control signal, which is a pulse width modulated (PWM) signal, and high and low side fast loop control signals, BH<1:m> and BL<1:n>, which are multi-bit signals.

The voltage regulator 200 has a slow loop for DC regulation and a fast loop for transient regulation. The slow loop essentially comprises a first current source 208 and a switch 210, while the fast loop comprises a high side power stage 212 and a low side power stage 214. The high and low side power stages 212 and 214 each include a plurality of pairs of an inverter and a transistor, where a respective one of the control bits is input to the inverter, and the output of the inverter is connected to the gate of the transistor. For the high side power stage 212, the transistors (source and drain) are connected to the supply voltage VSUPPLY and the output voltage VOUT, and for the low side power stage 212, the transistors are connected between the output voltage VOUT and ground. The inverters of the high side power stage 212 are connected between a high side voltage (VHISIDE) and a gate bias voltage (VGATEH), while the inverters of the low side power stage 212 are connected between respective high and low voltage (VHIGH and VLOW).

The gate voltage VGATEH is set by the trans-linear loop formed by the transistors of the high side power stage and first, second and third transistors 216, 218, and 220, and a second current source 222. The voltage VGATEH is adjusted by controlling the switch 210. When the switch 210 is CLOSED (on), the current from the first current source 208 flows through the first transistor 216, discharging the gates of the transistors of the high side power stage 212. When the switch 210 is OPEN (off), the current through the first transistor 216 charges the gates of the transistors of the high side power stage 212.

The output voltage VOUT is compared to the reference voltage VREF using the clocked comparator 204. The output of the comparator 204 controls the slow loop control signal such that the output voltage VOUT becomes equal to the reference voltage VREF.

The high and low side power stages 212 and 214 are broken down into a number of units (i.e., the inverter transistor pairs) to ensure a smooth response. Both of the high and low side power stages 212 and 214 are divided into m units, (here m=3) and are controlled by the control signals BH<1:m> and BL<1:m>. In order to control the high side devices, signals BH<1:m> are level shifted from the digital domain to the high side domain (VHISIDE−Vdda) using a fourth transistor 224 and a level shifter 226. If BH<i> is low/high then the power device gate is connected to vgateh/vhiside, respectively. The high side supply VHISIDE is created using fourth transistor 224, which is sized to ensure that it can provide enough current to charge the gates of the transistors of the high side power stage 212 within a certain time.

The controller 206 adjusts the biasing of the output power devices (high and low side transistors) to obtain a regulated output voltage. For example, when VOUT is greater than VREF, the low side transistors are turned on one-by-one (by incrementing the low side control signal BL<1:m>) until VOUT equals VREF, and when VOUT is less than VREF, the high side transistors are turned on one-by-one by incrementing the high side control signal BH<1:m> until VOUT equals VREF. When VOUT equals VREF, then the slow loop is enabled by closing the switch 210. The controller 206 may implement various algorithms to obtain fast transient response, such as hill-climbing algorithm, binary search algorithm, a combination of the two, etc. Further, although in the embodiment shown m=3, m may vary such that there are more or fewer stages of the high and low side power stages. Additionally, the number of stages may vary between the high and the low side, for example the high side having 5 stages and the low side having 3 or 4 stages.

The control signals BL<1:m> and BHL<1:m> are generated such that the output voltage VOUT remains constant when a load step is applied at the output. The control signals, for a particular load step, are the digital representation of that load step. Therefore, the digitally-assisted voltage regulator 200 acts as an ADC (Analog to Digital Converter) with load as an input.

For a given load, the load profile will change with process and temperature. For example, a gate driver will source a larger current in a fast process corner than in a nominal process corner. Thus, according to the present invention, and as described in more detail with reference to FIG. 3, the controller 206 will output a different sequence of control bits for a given load profile. The control bits BL, BH and slow loop control are used to estimate the load profile, which is compensated to match the nominal load profile. The nominal load profile can be given as an input. The control bits change depending on the load value and load ramp. Thus, a relationship can be established such that the load profile can be estimated depending on the control bits.

Figure 3:
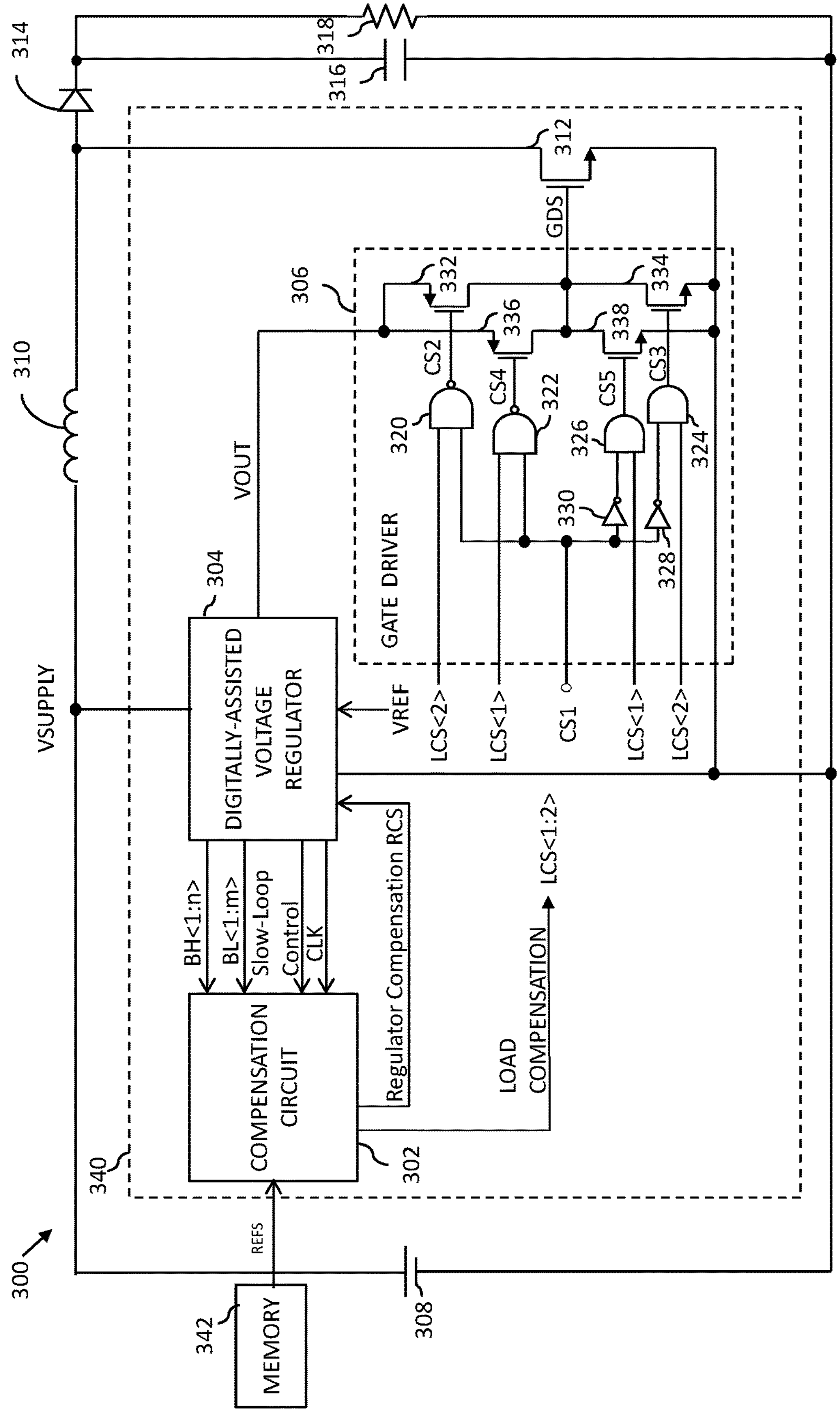
FIG. 3 is a schematic block diagram of a boost converter including a compensation circuit connected to a digitally-assisted voltage regulator and a gate driver circuit in accordance with an embodiment of the present invention.

The voltage regulator 200 provides BL<1:m>, BH<1:m>, and Slow Loop Control, and the clock CLK to a digital compensation circuit (302 in FIG. 3). The digital compensation circuit 302 estimates the load profile and generates the compensation settings for the regulator and/or the load. These settings are generated based on a digital reference code, which in one embodiment, is stored in an external memory. For example, the digital compensation can increase/decrease the output voltage VOUT of the regulator to compensate for a slow/fast process, respectively. Better compensation can be achieved by increasing/decreasing the drive strength of the gate driver for a slow/fast process, respectively.

FIG. 3 is a schematic block diagram of a boost converter 300 including a compensation circuit 302, a digitally-assisted voltage regulator 304, and a gate driver 306. The boost converter 300 also includes a voltage supply 308, an inductor 310, a first transistor 312, a diode 314, and a load capacitor 316. In one embodiment, the voltage regulator 304 is similar to the voltage regulator 200 of FIG. 2, although that is not required, as other conventional voltage regulators also may benefit from the compensation circuit 302 of the present invention.

The voltage regulator 304 is connected between a voltage supply 308 for receiving a supply voltage VSUPPLY, and ground. The voltage regulator 304 also receives a reference voltage signal VREF, and a regulator compensation signal RCS from the compensation circuit 302. In one embodiment, the voltage regulator 304 receives a bandgap voltage signal, i.e., the reference voltage signal VREF, from a reference voltage generator (not shown). The voltage regulator 304 generates an output voltage VOUT. The voltage regulator 304 also generates the control signals BH<1:m>, BL<1:m>, slow loop control, and a clock signal CLK. The control signals BH<1:m>, BL<1:n> (here m=2 and n=1), and slow loop control are used to control slow and fast loops of the voltage regulator 304, as discussed with reference to FIG. 2.

The voltage regulator 304 regulates a voltage level of the output voltage VOUT without any undershoot. The voltage regulator 304 includes a digital controller (e.g., controller 206) that generates the control signals (BH, BL and slow loop control) based on the current drained by the gate driver 306 from the voltage regulator 304.

The compensation circuit 302 is connected to the voltage regulator 304 and receives the control signals BH, BL and slow loop control, as well as the clock signal CLK. The compensation circuit 302 also receives a digital reference code as an input, which will be described in more detail below. In one embodiment, the compensation circuit 302 receives the digital reference code from an external memory 342. In another embodiment, the compensation circuit 302 is connected to an internal memory (not shown) and receives the digital reference code therefrom. The compensation circuit 302 generates the regulator compensation signal RCS, and a load compensation signal LCS, which in the embodiment shown is 2-bits. The compensation circuit 302 may be implemented using a digital controller, an application specific integrated circuit (ASIC) processor, a microcontroller, a known processor circuit, a field-programmable gate array (FPGA), and the like. The compensation circuit 302 generates the regulator compensation signal RCS and the load compensation signal LCS based on the digital reference code and the control signals BH, BL and slow loop control. The regulator compensation signal RCS controls the reference voltage signal VREF of the voltage regulator 304 in order to regulate the voltage level of the output voltage VOUT, while the load compensation signal LCS controls the strength of the gate driver 306.

The gate driver 306 is a variable strength gate driver circuit. The gate driver 306 is connected to the compensation circuit 302 and the voltage regulator 304 for receiving the load compensation signal LCS, and the output voltage VOUT, respectively. The gate driver 306 further receives a control enable signal CS1 from an external control signal generator (not shown). The gate driver 306 outputs a gate driver signal GDS that is used to control switching of the first transistor 312. The control enable signal CS1 enables the gate driver 306. In one embodiment, when the control enable signal CS1 is high (i.e., an active state), the gate driver 306 is operational and generates the gate driver signal GDS based on the value of the load compensation signal LCS, and conversely, when CS1 is low, the gate driver 306 is not operational and so outputs a low gate driver signal GDS (i.e., inactive). Based on the output voltage VOUT, the gate driver 306 drains current from the voltage regulator 304 at a rate that corresponds to a load profile of the gate driver 306. The strength of the gate driver 306 varies based on the load compensation signal LCS<1:2>.

The gate driver 306 is broken down into a number of units k (i.e., logic gate units and corresponding transistor units) for varying the strength of the gate driver signal GDS, and is controlled by the load compensation signal LCS<1:k> (here k=2) and the control enable signal CS1. In one embodiment, the gate driver 306 includes first and second 2-input NAND gates 320 and 322, first and second 2-input AND gates 324 and 326, first and second inverters 328 and 330, and second through fifth transistors 332-338. The second and third transistors 332-334 form a first transistor unit and the second and fourth and fifth transistors 336-338 form a second transistor unit. The first NAND gate 320, the first AND gate 324, and the first inverter 328 form a first logic gate unit, and the second NAND gate 322, the second AND gate 326, and the second inverter 330 form a second logic gate unit.

The first NAND gate 320 receives the second bit of the load compensation signal LCS<2> and the control enable signal CS1, and generates a first control logic signal CS2. The first AND gate 324 receives the second bit of the load compensation signal LCS<2> and an inverted control enable signal CS1, which is received from the first inverter 328, and generates a second control logic signal CS3. The second NAND gate 322 receives the first bit of the load compensation signal LCS<1> and the control enable signal CS1, and generates a third control logic signal CS4. The second AND gate 326 receives the first bit of the load compensation signal LCS<1> and an inverted control enable signal CS1 from the inverter 330, and generates a fourth control logic signal CS5.

The second transistor 332 has a source terminal connected to the voltage regulator 304 for receiving the output voltage VOUT, a gate terminal connected to the output of the first NAND gate 320 for receiving the first control logic signal CS2, and a drain terminal that provides the gate driver signal GDS. When the first control logic signal CS2 is low (i.e., when CS1 and LCS<1> both are high), the second transistor 332 is switched ON, and conversely, when CS2 is high (i.e., when either or both of CS1 and LCS<1> is low), the second transistor 332 is switched OFF.

The third transistor 334 has a drain terminal connected to the drain terminal of the second transistor 332, a gate terminal connected to the output of the first AND gate 324 for receiving the second control logic signal CS3, and a source terminal connected to ground. When CS3 is high, the third transistor 334 is switched ON, and when the CS3 is low, the third transistor 334 is switched OFF.

The fourth transistor 336 has a source terminal connected to the voltage regulator 304 for receiving the output voltage VOUT, a gate terminal connected to the output of the second NAND gate 322 for receiving the third control logic signal CS4, and a drain terminal that provides the gate driver signal GDS. When CS4 is low, the fourth transistor 336 is switched ON, and when CS4 is high, the fourth transistor 336 is switched OFF.

The fifth transistor 338 has a drain terminal connected to the drain terminal of the fourth transistor 336, a gate terminal connected to the output of the second AND gate 326 for receiving the fourth control logic signal CS5, and a source terminal connected to ground. When CS5 is high, the fifth transistor 338 is switched ON, and when CS5 is low, the fifth transistor 338 is switched OFF.

In one embodiment, the second and fourth transistors 332 and 336 are PMOS transistors, and the third and fifth transistors 334 and 338 are NMOS transistors. In an alternate embodiment, the second and fourth transistors 332 and 336 are NMOS transistors, and the third and fifth transistors 334 and 338 are PMOS transistors.

In one embodiment, internal characteristics, such as width to length ratio, of the second and fourth transistors 332 and 336 are the same, and therefore the strength of the gate driver signal GDS output by the second and fourth transistors 332 and 336 is the same. Thus, in such an embodiment, when one of the second and fourth transistors 332 and 336 is switched ON, the strength of the gate driver 306 is '1', and when both of the second and fourth transistors 332 and 336 are switched ON, the strength of the gate driver 306 is '2' (i.e., doubled). In another embodiment, the internal characteristics of the second and fourth transistors 332 and 336 are different, such that the strength of the gate driver signal GDS output by the fourth transistor 336 is twice the strength of the gate driver signal GDS output by the second transistor 332. Thus, in such an embodiment, when the second transistor 332 is switched ON and the fourth transistor 336 is switched OFF, the strength of the gate driver 306 is '1', and when the second transistor 232 is switched OFF and the fourth transistor 236 is switched ON, the strength of the gate driver 306 is '2'. Further, when both the second and fourth transistors 332 and 336 are switched ON, the strength of the gate driver 306 is '3'. It will be understood by those of skill in the art that the strength '3' for the gate driver 306 can also be achieved by having three transistor units that have same width to length ratio. Thus, when all three transistor units are enabled, the strength of the gate driver 306 is '3'.

It will be understood by a person skilled in the art that the gate driver 306 may comprise more than two transistor units to accommodate different strength requirements.

The inductor 310 has a first terminal connected to one side the voltage supply 308 for receiving the supply voltage VSUPPLY, and a second terminal connected to the drain terminal of the first transistor 312, and to an input of the diode 314. The charging and discharging of the inductor 310 is based on the switching of the first transistor 312.

The first transistor 312 has a drain terminal connected to the second terminal of the inductor 310, a gate terminal connected to the gate driver 306 for receiving the gate driver signal GDS, and a source terminal connected to ground. More particularly, as shown in FIG. 3, the gate of the first transistor 312 is connected to a node that connects the drain terminals of the second, third, fourth and fifth transistors 332, 334, 336, and 338.

The diode 314 has an input terminal connected to the second terminal of the inductor 310, and an output terminal. The load capacitor 316 and a load 318 are connected in parallel with each other, and are connected between the output terminal of the diode and ground. The diode 314 prevents the load capacitor 316 from discharging via the first transistor 312. The load capacitor 316 supplies a load current to the load 318 when the first transistor 312 is ON. The charging and discharging of the load capacitor 316 is based on the switching of the first transistor 312.

In one embodiment, the compensation circuit 302, voltage regulator 304, gate driver 306, and first transistor 312 are formed on an integrated circuit 340. The compensation circuit 302, voltage regulator 304, and gate driver 306 collectively form a PVT compensation system.

In operation, the gate driver 306 receives the output voltage VOUT from the voltage regulator 304. Based on the output voltage VOUT, the gate driver 306 drains current from the voltage regulator 304 and outputs the gate driver signal GDS. Due to PVT variations, the rate at which the gate driver 306 drains current may deviate from a desired rate, i.e., the load profile of the gate driver 306 changes. The change in the load profile causes a ramp-rate of the gate driver signal GDS to deviate from a desired ramp-rate. For example, under normal process and normal temperature conditions, the gate driver 306 has a predetermined load profile and drains current at a predetermined desired rate. Thus, the gate driver signal GDS has a known ramp-rate. However, different process and temperature conditions, the gate driver 306 may drain current at a faster rate, thus the load profile may change and the gate driver signal GDS may have an undesired ramp-rate. Based on the variations in the rate the current is drained by the gate driver 306, the gate driver 306 exhibits different load profiles under different process and temperature conditions.

The voltage regulator 304 generates the control signals BH, BL and slow loop control based on the load profile of the gate driver 306. These three control signals (sometimes referred to below as the first three control signals) collectively include a first set of bits that represent a digital load profile of the gate driver 306. For example, if BH is '11', BL is '0', and the slow loop control is '1', then the four bits together '1101' collectively represent a digital load profile '1101' of the gate driver 306. Different values of these control signals represent different load profiles. For example, if the control signals have values '11', '1', and '1' then the digital load profile of the gate driver 306 is '1111'. In another example, the control signals may have values '01', '0', and '0' that represent a digital load profile of '0100'. The compensation circuit 302 receives these control signals and the clock signal CLK.

In the presently preferred embodiment, the compensation circuit 302 receives the digital reference code (REFS) that is stored in the external memory 342. In one embodiment, the digital reference code REFS is used to access a look-up table (LUT) to determine a designed strength for the gate driver signal GDS. An example LUT is shown as Table 1 below:

TABLE 1

| PROCESS CONDITION | TEMPERATURE CONDITION | REFERENCE DIGITAL LOAD PROFILE | DESIRED VOLTAGE LEVEL OF OUTPUT VOLTAGE (VOUT) | DESIRED STRENGTH OF GATE DRIVER |
|---|---|---|---|---|
| SLOW | COLD | 0001 | 5.5 V | 3 |
| SLOW | NORMAL | 0010 | 5.3 V | 3 |
| SLOW | HOT | 0110 | 5.1 V | 3 |
| NORMAL | COLD | 0011 | 5.2 V | 2 |
| NORMAL | NORMAL | 0100 | 5 V | 2 |
| NORMAL | HOT | 1000 | 4.6 V | 2 |
| STRONG | COLD | 0101 | 4.8 V | 1 |
| STRONG | NORMAL | 0111 | 4.3 V | 1 |
| STRONG | HOT | 1111 | 4.2 V | 1 |

The LUT includes different process conditions, such as slow, normal and strong, and temperature conditions, such as cold, normal and hot, under which the boost converter 300 may operate. The LUT further includes a reference digital load profile corresponding to various desired process and temperature conditions, where each load profile includes a desired voltage level of the output voltage VOUT and a desired strength of the gate driver signal GDS for that load profile. The desired voltage level of the output voltage VOUT corresponds to a voltage level of output voltage VOUT that is to be achieved under the corresponding process and temperature conditions. The desired strength of the gate driver signal GDS corresponds to the strength of the gate driver signal needed to output the gate driver signal GDS under the corresponding process and temperature conditions. In operation, the compensation circuit 302 receives the digital reference code REFS from the external memory 342 and obtains this information using the digital reference code REFS.

When the clock signal CLK is high, the compensation circuit 302 identifies the digital load profile represented by the loop control signals (BH, BL, slow-loop control). For example, for a particular load profile of the gate driver 306, the voltage regulator 304 outputs the control signals BH<1:2>, BL<1:1>, and slow loop control, which represent a digital load profile '1111'. The compensation circuit 302 receives the first set of bits "1111" from the regulator 304. The compensation circuit 302 refers to the digital reference code REFS and selects a reference digital load profile that corresponds to the digital load profile '1111'. As shown in Table 1, the reference digital load profile '1111' corresponds to strong process and hot temperature conditions. The compensation circuit 302 further identifies the desired voltage level of the output voltage VOUT to be '4.2V', and the desired strength of the gate driver 306 to be '1' for the reference digital load profile '1111' from the digital reference code REFS (see Table 1).

The compensation circuit 302 outputs the regulator compensation signal RCS to achieve the desired voltage level of '4.2V' of the output voltage VOUT. In one embodiment, the regulator compensation signal RCS is a voltage signal having a voltage level equal to the desired voltage level. For example, if the desired voltage level is '4.2V', the compensation circuit 302 outputs the regulator compensation signal RCS at '4.2V'. In another embodiment, the regulator compensation signal RCS is a signal having a voltage level equal to a difference of the desired voltage level and the reference voltage VREF. For example, if the desired voltage level is '4.2V' and the reference voltage signal VREF is '5V', the compensation circuit 302 outputs RCS at '−0.8V'. The voltage regulator 304 receives RCS=(0.8), and then modifies VREF to '4.2V'. In another example, if VREF is initially at '5V' and RCS is '4.2V', then VREF is decreased to '4.2V'. Based on the modified values of VREF, the voltage regulator 304 regulates the output voltage VOUT to achieve a voltage level of '4.2V'.

The compensation circuit 302 also outputs the load compensation signal LCS<1:2> as '01' to achieve the desired strength of the gate driver 306 as '1'.

The gate driver 306 receives LCS='01' and the control enable signal CS1. The first NAND gate 320 and the first AND gate 324 receive the second bit '1'. The first NAND gate 320 also receives the control enable signal CS1, while the first AND gate 324 receives the inverted CS1 from the first inverter 328. The second NAND gate 322 and the second AND gate 326 receive the first bit '0'. The second NAND gate 322 receives the control enable signal CS1 and the second AND gate 326 receives the inverted CS1 from the second inverter 330.

When the control enable signal CS1 is high, CS2 and CS3 go low. With CS2 and CS3 being applied to the gates of the second and third transistors 332 and 334, respectively, then the second transistor 332 is switched ON and the third transistor 334 is switched OFF. Further, the gate of the fourth transistor 336 receives the third control logic signal CS4 at logic high, and the gate terminal of the fifth transistor 338 receives the fourth control logic signal CS5 at logic low. Hence, the fourth and fifth transistors 336 and 338 are switched OFF. Thus, the desired strength of '1' of the gate driver 306 is achieved. The gate driver 306 controls the ramp-rate of the gate driver signal GDS based on the desired gate strength '1'.

Since the voltage regulator 304 generates the output voltage VOUT at '4.2V' and the gate driver 306 achieves the desired strength of '1', the deviation in the ramp-rate of the gate driver signal GDS is compensated for. The second transistor 332 outputs the gate driver signal GDS at the desired ramp-rate, which compensates for PVT variations. As the first transistor 312 receives the gate driver signal GDS at the desired ramp-rate, erroneous switching of the first transistor 312 due to PVT variations is prevented.

When the gate driver signal GDS is high, the first transistor 312 is switched ON. When the first transistor 312 is switched ON, the diode 314 is reverse biased and the inductor 310 is connected to ground by way of the first transistor 312. As the supply voltage VSUPPLY has a constant voltage level, the inductor 310 is charged by way of a linearly increasing current level of the supply voltage VSUPPLY. Further, the load capacitor 316 supplies the load current to the load 318, which discharges the load capacitor 316. With the diode 314 reversed biased, the discharging of the load capacitor 316 by way of the first transistor 312 is prevented. Conversely, when the gate driver signal GDS is low, the first transistor 312 is switched OFF. When the first transistor 312 is OFF, the diode 314 is forward biased and the inductor 310 is connected to the load capacitor 316 by way of the diode 314. The inductor 310 then charges the load capacitor 316.

In another embodiment, the fast and slow loop control signals (BH, BL, slow loop control) may represent another digital load profile '0001'. Thus, the compensation circuit 302 provides the regulator compensation signal RCS to achieve the desired voltage level of '5.5V' for the output voltage VOUT and the load compensation signal LCS<1:2> as '11' to achieve the desired strength of '3' for the gate driver 306.

The boost converter 300 does not require process and temperature sensors, which reduces die area and chip cost of the boost converter 300 compared to conventional boost converters. The boost converter 300 can function for both high and low input voltage applications. In one embodiment, the boost converter 300 may be used in security applications. For example, the load profiles for the gate driver 306 are fixed, so when the gate driver 306 exhibits any load profile other than the fixed load profile, the alternative load profile is indicative of a security breach.

It will be understood by those of skill in the art that the same logical functions may be performed by different arrangements of logic gates, or that logic circuits may operate using either positive or negative logic signals (i.e., high logic state or low logic state). Therefore, variations in the arrangement of some of the logic gates described above should not be considered to depart from the scope of the present invention. Further, the use of the PVT compensating system is not limited to the boost converter 300.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A voltage regulation system, comprising:

a digitally-assisted voltage regulator that receives a supply voltage and a reference voltage, and generates a regulated voltage signal and at least one control signal;

a variable strength gate driver circuit connected to the digitally-assisted voltage regulator for receiving the regulated voltage signal, a load compensation signal, and a control enable signal, and generating a gate driver signal;

a gate driver transistor connected between the supply voltage and ground, and having a gate that receives the gate driver signal; and a compensation circuit connected to the digitally-assisted voltage regulator for receiving the at least one control signal, using the at least one control signal to estimate a load profile of a load connected to the voltage regulation system and generating a regulator compensation signal and the load compensation signal based on a digital reference code stored in a memory in order to adjust the regulated voltage signal to compensate for differing process and temperature conditions, wherein the regulator compensation signal is provided to the digitally-assisted voltage regulator to adjust a level of the reference voltage in order to regulate the voltage level of the regulated voltage signal, and the load compensation signal is provided to the variable strength gate driver circuit to control a ramp-rate of the gate driver signal.

2. The voltage regulation system of claim 1, wherein the variable strength gate driver circuit comprises:

a plurality of logic gates connected to the compensation circuit for receiving the load compensation signal, and generating a plurality of control logic signals; and a plurality of transistors connected to the plurality of logic gates for receiving the plurality of control logic signals, and outputting the gate driver signal, wherein the plurality of transistors is enabled by the plurality of control logic signals to control the ramp-rate of the gate driver signal.

3. The voltage regulation system of claim 2, wherein the plurality of logic gates comprise:

a first logic gate connected to the compensation circuit for receiving the load compensation signal, and outputting a first control logic signal of the plurality of control logic signals based on the control enable signal; and a second logic gate connected to the compensation circuit for receiving the load compensation signal, and outputting a second control logic signal of the plurality of control logic signals based on the control enable signal, and wherein the plurality of transistors comprise:

a first transistor that has a gate terminal connected to the first logic gate for receiving the first control logic signal, a source terminal connected to the digitally-assisted voltage regulator for receiving the regulated voltage signal, and a drain terminal for outputting the gate driver signal; and a second transistor that has a gate terminal connected to the second logic gate for receiving the second control logic signal, a source terminal connected to ground, and a drain terminal connected to the drain terminal of the first transistor.

4. The voltage regulation system of claim 3, wherein the first logic gate is a NAND gate and the second logic gate is an AND gate.

5. The voltage regulation system of claim 1, wherein the at least one control signal comprises a first set of bits that represent a load profile of the variable strength gate driver circuit, and wherein the load profile corresponds to a rate at which the variable strength gate driver circuit drains current from the digitally-assisted voltage regulator.

6. The voltage regulation system of claim 1, wherein the compensation circuit further receives the digital reference code that includes information related to a plurality of reference digital load profiles of the variable strength gate driver circuit, wherein each load profile includes a desired voltage level of the regulated voltage signal, and a desired strength of the variable strength gate driver circuit.

7. The voltage regulation system of claim 6, wherein the compensation circuit receives the digital reference code from an external memory.

8. The voltage regulation system of claim 6, wherein the compensation circuit selects a first reference digital load profile of the plurality of reference digital load profiles based on the at least one control signal, and generates the regulator compensation signal and the load compensation signal using the first reference digital load profile, and wherein the first reference digital load profile includes a first desired voltage level of the regulated voltage signal and a first desired gate strength of the variable strength gate driver circuit.

9. The voltage regulation system of claim 8, wherein the variable strength gate driver circuit receives the load compensation signal and controls the ramp-rate of the gate driver signal based on the first desired gate strength.

10. The voltage regulation system of claim 1, further comprising:

an inductor that has a first terminal for receiving the supply voltage, and a second terminal connected to a drain terminal of the gate driver transistor;

a diode having an input terminal connected to the second terminal of the inductor and an output terminal; and a capacitor that has a first terminal connected to the output terminal of the diode and a second terminal connected to ground, wherein charging and discharging of the inductor and the capacitor are based on switching of the gate driver transistor, and wherein the capacitor provides a load current to a load connected to the voltage regulation system.

11. The voltage regulation system of claim 1, wherein the voltage regulation system is a boost converter.

12. A boost converter, comprising:

a digitally-assisted voltage regulator that receives a supply voltage and a reference voltage, and generates a regulated voltage signal and at least one control signal;

a variable strength gate driver circuit connected to the digitally-assisted voltage regulator for receiving the regulated voltage signal, a load compensation signal, and a control enable signal, and generating a gate driver signal;

a compensation circuit connected to the digitally-assisted voltage regulator for receiving the at least one control signal, using the at least one control signal to estimate a load profile of a load connected to the voltage regulation system, and generating a regulator compensation signal and the load compensation signal based on a digital reference code stored in a memory in order to adjust the regulated voltage signal to compensate for differing process and temperature conditions, wherein the regulator compensation signal is fed to the digitally-assisted voltage regulator to adjust a level of the reference voltage in order to regulate a voltage level of the regulated voltage signal therewith, and wherein the load compensation signal is provided to the variable strength gate driver circuit to control a ramp-rate of the gate driver signal therewith;

a gate driver transistor that has a gate terminal connected to the variable strength gate driver circuit for receiving the gate driver signal, wherein the gate driver signal controls switching of the gate driver transistor;

an inductor that has a first terminal for receiving the supply voltage, and a second terminal connected to a drain terminal of the gate driver transistor; and a capacitor that has a first terminal connected to the second terminal of the inductor, wherein charging and discharging of the inductor and the capacitor are based on switching of the gate driver transistor, and wherein the capacitor provides a load current to a load connected to the boost converter.

13. The boost converter of claim 12, wherein the variable strength gate driver circuit comprises:

a plurality of logic gates connected to the compensation circuit for receiving the load compensation signal, and generating a plurality of control logic signals; and a plurality of transistors connected to the corresponding plurality of logic gates for receiving the corresponding plurality of control logic signals, and outputting the gate driver signal, wherein the plurality of transistors are enabled based on the corresponding plurality of control logic signals for controlling the ramp-rate of the gate driver signal.

14. The boost converter of claim 13, wherein the plurality of logic gates comprise:

a first logic gate connected to the compensation circuit for receiving the load compensation signal, and outputting a first control logic signal of the plurality of control logic signals based on the control enable signal; and a second logic gate connected to the compensation circuit for receiving the load compensation signal, and outputting a second control logic signal of the plurality of control logic signals based on the control enable signal, and wherein the plurality of transistors comprise:

a second transistor that has a gate terminal connected to the first logic gate for receiving the first control logic signal, a source terminal connected to the digitally-assisted voltage regulator for receiving the regulated voltage signal, and a drain terminal connected to the gate driver transistor for outputting the gate driver signal thereto; and a third transistor that has a gate terminal connected to the second logic gate for receiving the second control logic signal, a source terminal connected to ground, and a drain terminal connected to the drain terminal of the second transistor.

15. The boost converter of claim 12, wherein the at least one control signal comprises a first set of bits that represent a load profile of the variable strength gate driver circuit, and wherein the load profile corresponds to a rate at which the variable strength gate driver circuit drains current from the digitally-assisted voltage regulator.

16. The boost converter of claim 12, wherein the compensation circuit further receives the digital reference code that includes information related to a plurality of reference digital load profiles of the variable strength gate driver circuit, wherein each load profile includes a desired voltage level of the regulated voltage signal, and a desired strength of the variable strength gate driver circuit.

17. The boost converter of claim 16, wherein the compensation circuit selects a first reference digital load profile of the plurality of reference digital load profiles based on the at least one control signal, and generates the regulator compensation signal and the load compensation signal, and wherein the first reference digital load profile includes a first desired voltage level of the regulated voltage signal and a first desired gate strength of the variable strength gate driver circuit.

18. The boost converter of claim 17, wherein the variable strength gate driver circuit receives the load compensation signal and controls the ramp-rate of the gate driver signal based on the first desired gate strength.

19. The boost converter of claim 12, wherein the digitally-assisted voltage regulator comprises:

a clocked comparator that receives the regulated voltage signal, the reference voltage and a clock signal, and generates a comparison signal;

a controller connected to the clocked comparator for receiving the comparison signal and the clock signal, and generating the at least one control signal, wherein the at least one control signal comprises high and low side fast loop control signals and a slow loop control signal;

a slow loop including a first current source having a first terminal connected to a source of a first transistor, and a switch connected between a second terminal of the first current source and ground, wherein the switch is controlled by the slow loop control signal;

a trans-linear loop including: (i) a second current source having a first terminal that receives the supply voltage and a second terminal connected to a gate of the first transistor, (ii) the first transistor having a drain that receives the supply voltage, (iii) a second transistor having gate and drain terminals connected to the second terminal of the second current source, and (iv) a third transistor having gate and drain terminals connected to a source terminal of the second transistor and a source terminal that provides the regulated voltage signal;

a level shifting circuit including a fourth transistor having a drain that receives the supply voltage, a gate that receives a bias voltage and a source that provides a high-side voltage, and a level shifter connected between the source of the fourth transistor and the source of the third transistor, wherein the level shifter receives the high side fast loop control signal and level shifts the high side fast loop control signal to a high-side control signal;

a high side power stage comprising a plurality of high-side units connected between the source of the third transistor and the supply voltage, and the high side power stage receiving the high-side control signal; and a low side power stage comprising a plurality of low-side units connected between the source of the third transistor and ground, and the low side power stage receiving the low side fast loop controls signal.

20. The boost converter of claim 19, wherein the digitally-assisted voltage regulator receives the regulator compensation signal and adjust a value of the reference voltage therewith.

21. The boost converter of claim 19, wherein each high-side unit comprises an inverter that receives a bit of the high-side control signal and a transistor having a drain that receives the supply voltage, a source connected to the source of the third transistor, and a gate connected to an output of the inverter, and wherein when the slow loop switch is closed, a current from the first current source flows through the first transistor and discharges the gates of the transistors of the high side power stage, and when the slow loop switch is open, the current through the first transistor charges the gates of the transistors of the high side power stage.

22. The boost converter of claim 19, wherein each low-side unit comprises an inverter that receives a bit of the low side fast loop control signal and a transistor having a drain connected to the source of the third transistor, a source connected to ground, and a gate connected to an output of the inverter.

* * * * *